Dec. 12, 1961     E. G. SPISAK     3,012,823
WHEEL TRIM
Filed Oct. 3, 1958
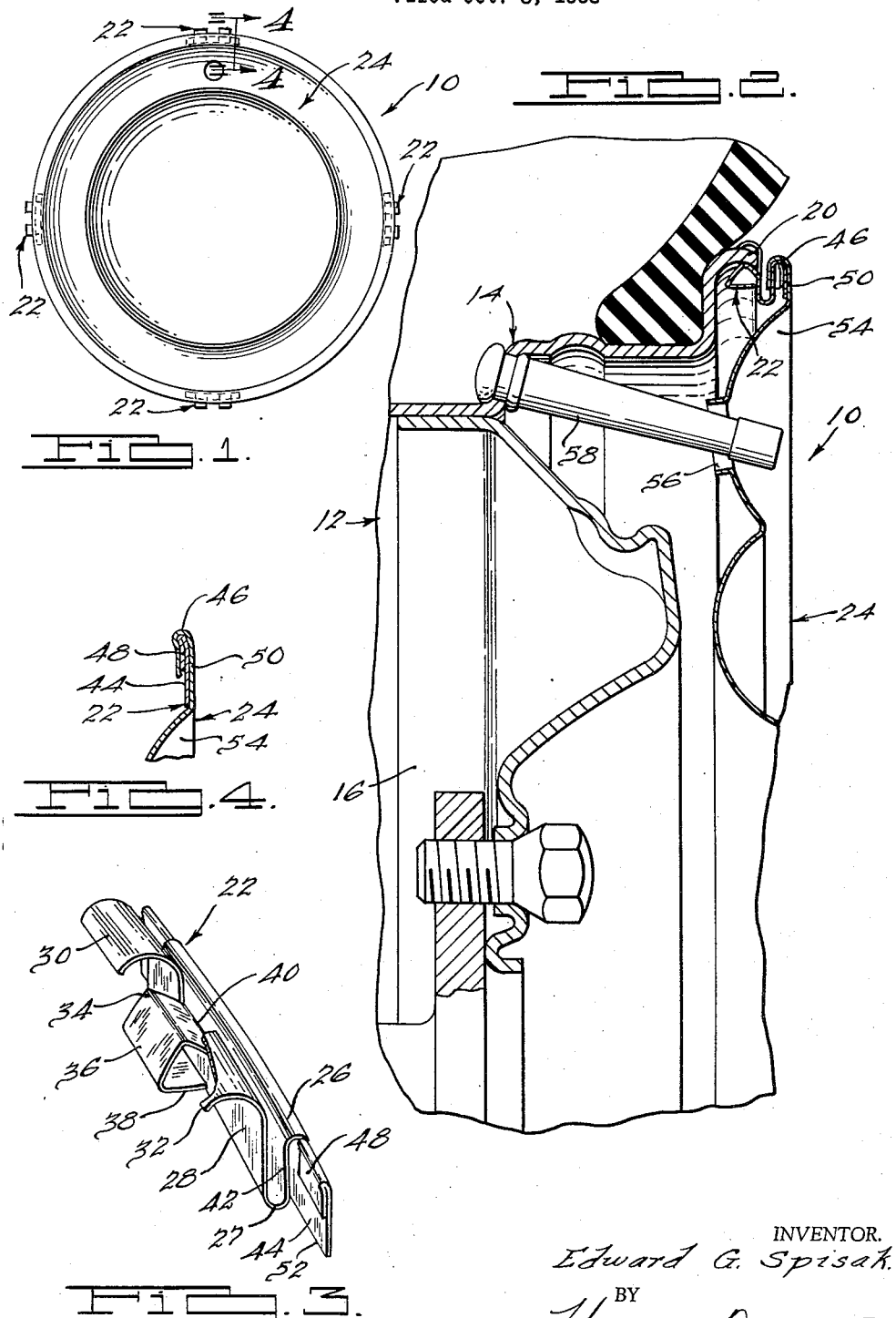
INVENTOR.
Edward G. Spisak.
BY
Harness, Dickey & Pierce
ATTORNEYS United States Patent Office
3,012,823
Patented Dec. 12, 1961

3,012,823
WHEEL TRIM
Edward G. Spisak, Wayne, Mich., assignor to Gar Wood Industries, Inc., Wayne, Mich., a corporation of Michigan
Filed Oct. 3, 1958, Ser. No. 765,195
4 Claims. (Cl. 301—37)

This invention relates to an improved protective and ornamental wheel trim assembly, including improved retaining means for securely holding the assembly upon the face of a vehicle wheel while still permitting easy removal of the assembly for servicing.

One important object of the present invention is to provide an improved wheel trim assembly including improved retaining spring clips for holding the trim assembly on the face of a vehicle wheel.

Further objects of the invention are: to provide an improved wheel trim assembly including a retaining spring clip capable of securely holding the trim assembly on the wheel during rough road operation yet permitting ready removal of the assembly for servicing when desired; to provide in a wheel trim assembly an improved spring clip which is arranged for gripping the terminal flange of a vehicle wheel with a pinching action, and for supporting the trim assembly in a relatively rigid spaced relation to the wheel; to provide an improved clip of this character which is relatively inexpensive to make, and which is quickly and inexpensively attachable to the assembly; and in general to provide an improved spring clip for use in a wheel trim assembly which is highly effective and rugged in operation, and yet inexpensive to manufacture and to secure permanently to the trim assembly.

The foregoing and further objects and advantages of the present invention will become apparent in the following detailed description of a preferred embodiment thereof taken in conjunction with the drawing wherein:

FIGURE 1 is a front elevational view of a wheel trim assembly according to a preferred embodiment of the invention;

FIG. 2 is a fragmentary cross-sectional view of the trim assembly shown in FIG. 1 illustrating the assembly in position upon the face of a vehicle wheel;

FIG. 3 is a perspective view, partly broken away, of one of the spring clips of the assembly illustrated in FIGS. 1 and 2; and FIG. 4 is a fragmentary cross section taken along the line 4—4 of FIG. 1.

A wheel trim assembly 10 according to a preferred embodiment of the invention is shown in the drawing mounted upon an automobile wheel 12 of the type having a drop center rim 14 and a load bearing body portion, or spider 16. The rim 14 is formed at its outer end to provide a slightly curled, axially extending terminal flange 20, which is engaged by the retaining clips 22 of the trim assembly 10 for retaining the assembly on the face of the wheel.

The trim assembly 10 includes a circular body member 24 which may be of any desired oranmental configuration, and as shown is in the shape of a disc-like cover which conceals substantially the entire outer face of the wheel 12, being approximately equal in diameter to the diameter of the terminal rim flange 20. At least three, and preferably four spring clips 22 are rigidly secured at intervals around the edge of the cover 24 for engaging the terminal rim flange 20 and thereby holding the cover upon the wheel.

The spring clips 22 are each formed of a single piece of sheet metal spring stock and are of integral construction. They are generally serpentine in cross-sectional shape, and may perhaps be best described with reference to the two major loops 26 and 27, which connect the different portions of each clip. First the retaining, or wheel gripping portion 28, which extends radially outwardly and rearwardly from the second loop 27 includes two spaced apart fingers 30 and 32, which extend parallel to each other and are curved rearwardly to fit over and rest upon the outer surface of the rim flange 20.

The stock between the fingers 30 and 32 is bent downwardly and looped over upon itself to form a nose 34, which, when the clip is in place upon the wheel, rests inside the rim flange 20. The noses 34 of the clips are arranged on a circle of slightly greater diameter than the inside diameter of the rim flange 20, so that normally they are in resilient pressure engagement with the flange.

The fingers 30 and 32, which overlie the flange 20, function to keep the nose 34 constantly in engagement with the flange 20 despite distortion of the wheel such as may be caused by rough road operation. The clips 22 are relatively stiff and are not highly flexible, so that in the absence of the fingers 30 and 32, the nose 34 could readily be withdrawn from the rim flange 20 when the wheel is distorted to an oval shape by a road shock or the like. The fingers 30 and 32 prevent this, and draw the nose portion 34 radially outwardly with the flange 20 when the flange tends to move outwardly away from the clip.

The nose 34 includes a relatively flat cam portion 36, which slopes rearwardly and radially inwardly, and which is positioned to strike the rim flange 20 during application of the trim assembly to the wheel and to cam the nose 34 radially inwardly, guiding it relatively easily into the flange 20.

The terminal portion 38 of the nose is bent under and extends forwardly approximately parallel to the wheel axis into close proximity to the radially inner end of the wheel gripping portion 28 to provide support for the nose 34 and to prevent its being bent out of its normal position beyond its elastic limit. During application of the trim assembly upon the wheel, and during times when the wheel is distorted, the radially inward force upon the nose 34 may be sufficient to overcome the resilience of the nose itself, and it is during these times that the terminal portion 38 comes into play, reinforcing the nose 34 and transferring some of the load applied to it to the other portions of the clip. During these times, the terminal portion 38, being disposed radially inwardly of the line 40 about which the nose 34 tends to pivot, moves outwardly into contact with the main wall of the portion 28, thereby providing added support for the nose to limit the bending of the nose 34 relative to the main wall and transfer the nose load to and distribute it over the rest of the clip.

The intermediate portion 42 of the clip is substantially flat, and is disposed approximately parallel to the main wall of the gripping portion 28. It is also of about the same width as the gripping portion 28.

The base portion 44 serves to secure the clip within the radially inwardly turned peripheral flange 46 of the body member 24. It is wider than the rest of the clip, and extends circumferentially on both sides of the intermediate and gripping portions 42 and 28, respectively. The extended portions of the base 44 are provided with ears, or tabs 48 which are bent over upon the base 44 to increase its thickness and thereby to improve the clinching engagement of the clip in the cover flange 46. The base portion 44 and the first loop 26 are preferably curved as illustrated about the wheel axis to conform to the peripheral curvature of the body member 24, in order to provide maximum support for the clip in a radial direction and to distribute the load over a relatively wide portion of the cover flange 46.

In assembly, the clips 22 are slipped into the cover flange 46 and are then clinched therein by rolling or pressing the flange 46 upon the tabs 48. It has been found that this manner of attachment is sturdy and reliable and is effective to hold the clips 22 permanently in place. Additionally, the radial dimension of the base portion 44 is preferably made about equal to the width of the flat portion 50 of the cover so that it fits snugly thereagainst. The inner edge 52 of the base portion then rests against the rearwardly curved portion 54 of the body member, and is thereby restrained against radially inward displacement.

In applying the trim assembly 10 to the wheel 12, the valve stem aperture 56 is first fitted over the tire valve stem 58 to insure proper alignment of the trim on the wheel. The trim is then placed flat against the wheel to bring the clips 22 into engagement with the terminal flange 20, and is then forced on the wheel, preferably by applying pressure at intervals around the outer portion of the body member 24. The fingers 30 and 32 ride up over the flange 20, while the nose 34 of each clip is cammed radially inwardly to seat within the flange 20.

The trim assembly 10 may be removed from the wheel by conventional means such as a pry bar inserted between the rim flange 20 and the body member flange 46 at any point around the periphery thereof. Removal is relatively easy since there is substantially no locking action by the clips 22 upon the flange 20, that is, the gripping portion 28 does not pivot enough in response to a pry-off force to increase the grip of the gripping portion 28 upon the flange 20 to an appreciable extent.

The clip 22 of the present invention is relatively inexpensive to manufacture; is capable of compensating for relatively large dimensional variations between the wheel and the trim assembly such as are caused by manufacturing tolerances; retains the trim assembly on the wheel even in rough road operation; resists fatigue so that it may be applied and removed repeatedly without losing its retaining strength or suffering a change in its "feel" of application and removal, and may be readily removed for servicing when desired.

What is claimed is:

1. In a wheel trim assembly for disposition on the outer face of a vehicle wheel of the type having an axially extending terminal flange, the combination of a circular body member of approximately the same diameter as the terminal flange of the wheel, and a plurality of spring clips secured to said body member at intervals around the periphery thereof for gripping the terminal flange and thereby resiliently retaining said body member on the wheel, each one of said clips being formed of a single piece of sheet spring material and including a wheel gripping portion having a pair of spaced fingers positioned to extend over and rest upon the radially outer surface of the terminal flange; and a central nose portion disposed between said fingers and positioned to engage the radially inner surface of the terminal flange, said nose portion and said fingers being arranged to co-act with each other for gripping the terminal flange with a pinching action, said nose portion having a terminal end portion engageable with said wheel gripping portion for supporting said nose portion.

2. In a wheel trim assembly for disposition on the outer face of a vehicle wheel of the type having an axially extending terminal flange, the combination of a circular body member of approximately the same diameter as the terminal flange of the wheel, and a plurality of spring clips secured to said body member at intervals around the periphery thereof for gripping the terminal flange and thereby resiliently retaining said body member on the wheel, each one of said clips being formed of a single piece of sheet spring material and including a wheel gripping portion having a pair of spaced fingers positioned to extend over and rest upon the radially outer surface of the terminal flange, the material between said fingers forming a nose portion extending under and positioned to engage the radially inner surface of the terminal flange and to cooperate with said fingers for gripping the terminal flange with a pinching action, said nose portion having a terminal end portion engageable with said wheel gripping portion for supporting said nose portion.

3. In a wheel trim assembly for disposition on the outer face of a vehicle wheel of the type having an axially outwardly extending terminal flange, the combination of a circular body member of approximately the same diameter as the terminal flange of the wheel and having a radially inwardly turned peripheral flange, and a plurality of spring clips clinched within said peripheral flange at intervals therearound and arranged for gripping the terminal flange of the wheel and thereby resiliently retaining said body member on the wheel, each one of said clips being formed of a single piece of sheet spring material and including a base portion clinched within the peripheral flange of the body member, and a gripping portion including a pair of circumferentially spaced curved fingers positioned to extend over and rest upon the radially outer surface of the terminal flange, the material between said fingers forming a nose portion extending under and positioned to engage the radially inner surface of terminal flange and to cooperate with the fingers for gripping the terminal flange with a pinching action, the terminal part of the bent under material extending into close proximity with another part of said clip so as to be engageable therewith for supporting said nose against excessive displacement and to distribute the load on said nose portion over the rest of the clip.

4. In a wheel trim assembly for disposition on the outer face of a vehicle wheel of the type having an axially outwardly extending terminal flange, the combination of a circular body member of approximately the same diameter as the terminal flange of the wheel and having a radially inwardly turned peripheral flange, and a plurality of spring clips clinched within said peripheral flange at intervals therearound and arranged for gripping the terminal flange of the wheel and thereby resiliently retaining said body member on the wheel, each one of said clips being formed of a single piece of sheet spring material and including a base portion clinched within the peripheral flange of the body member, and a gripping portion including a pair of circumferentially spaced curved fingers positioned to extend over and rest upon the outer surface of the terminal flange, the material between said fingers forming a nose extending under and positioned to engage the radially inner surface of the terminal flange and to cooperate with the fingers for gripping the terminal flange with a pinching action, the terminal part of said nose extending into close proximity to another part of said clip so as to be engageable therewith for supporting said nose against excessive displacement and to distribute the load on said nose over the rest of the clip, said nose having a surface sloping radially inwardly with respect to the central axis of said trim assembly constituting a cam surface for engaging the edge of the terminal flange during application of the trim assembly onto the wheel for camming the nose radially inwardly as the trim is driven into place.

References Cited in the file of this patent

UNITED STATES PATENTS

| | | |
|---|---|---|
| 656,805 | Bowman | Aug. 28, 1900 |
| 2,404,389 | Lyon | July 23, 1946 |
| 2,469,997 | Simpson | May 10, 1949 |
| 2,749,184 | Wood | June 5, 1956 |
| 2,915,335 | Barnes | Dec. 1, 1959 |